United States Patent Office 3,345,871
Patented Oct. 10, 1967

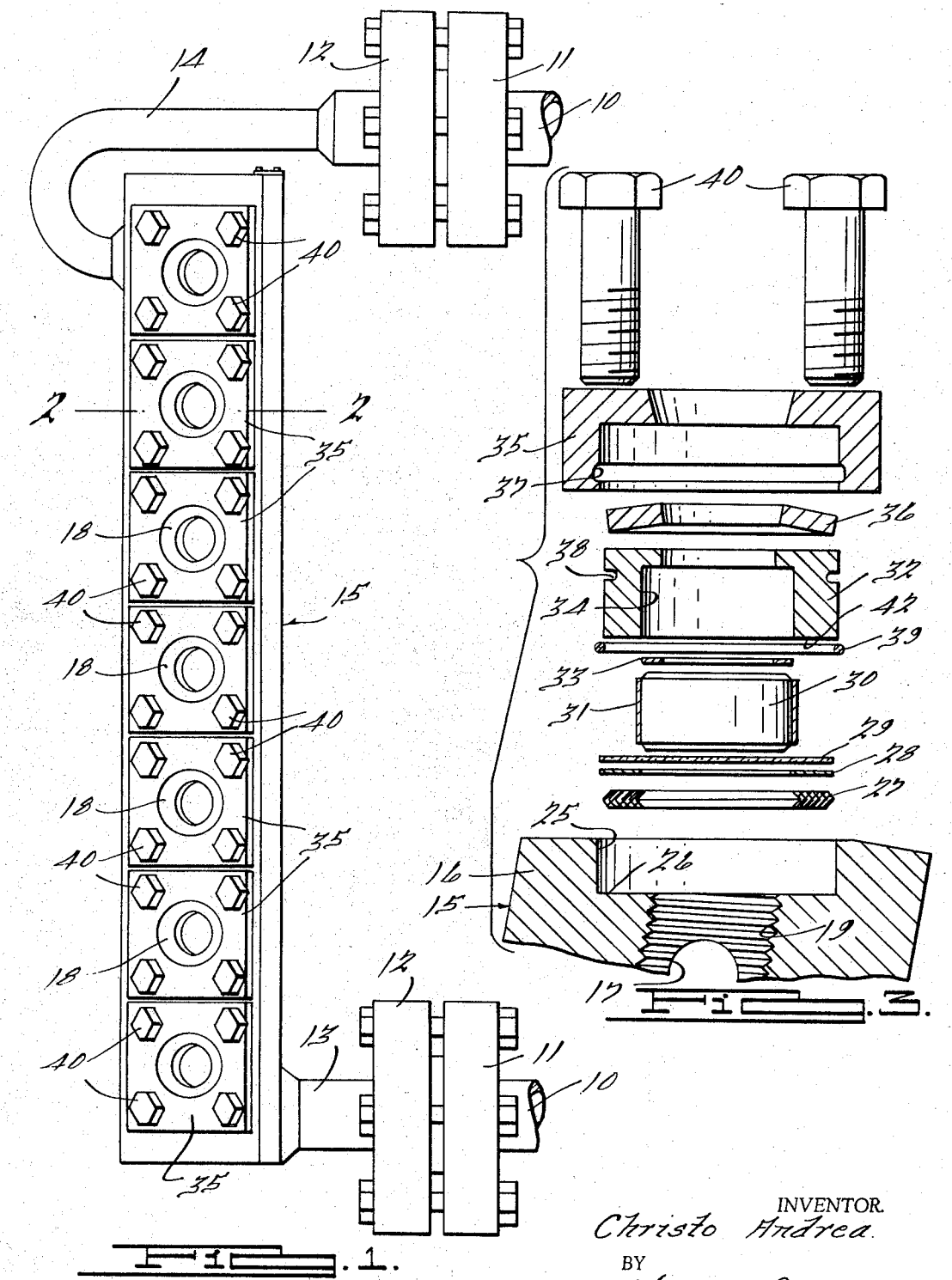

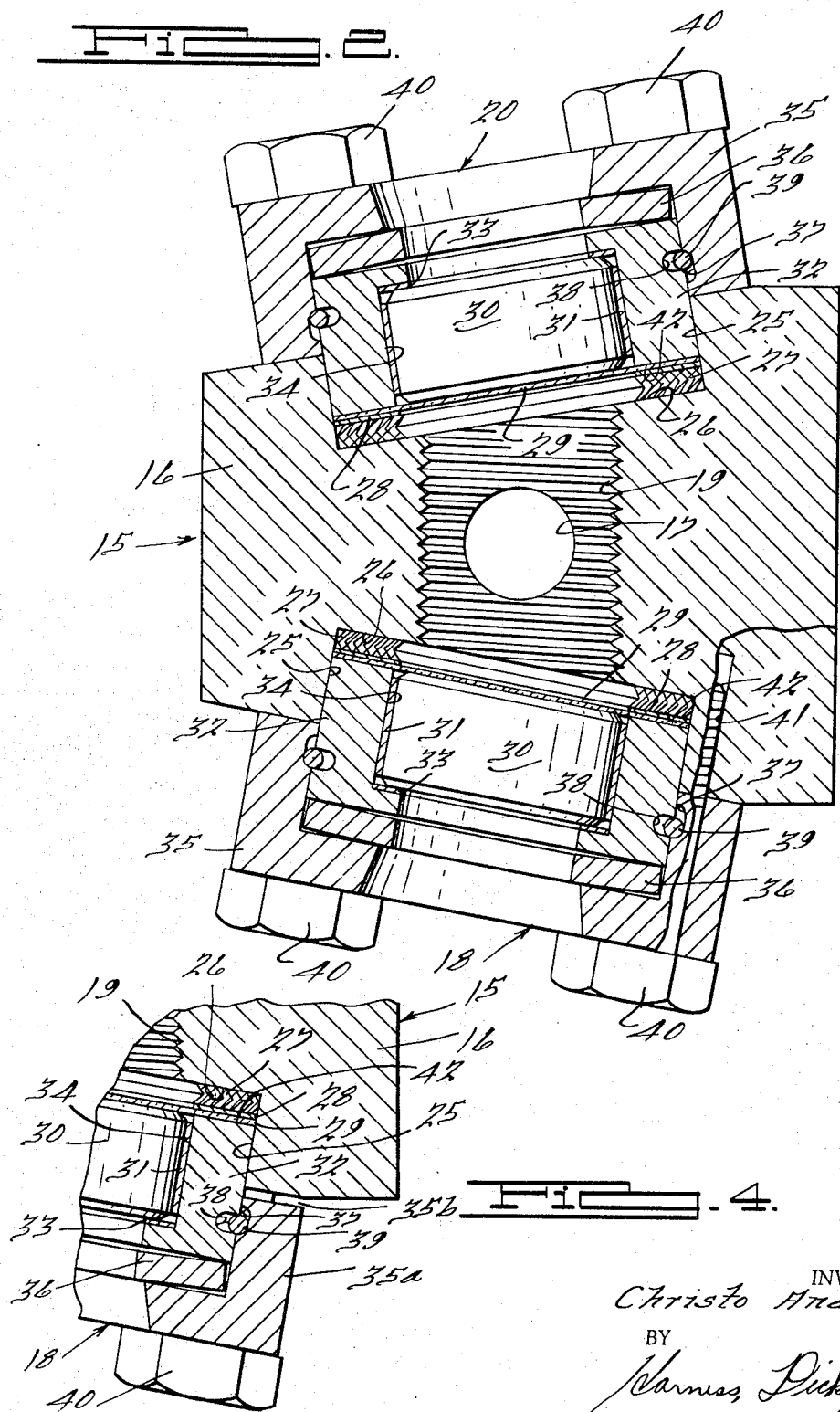

3,345,871
LIQUID LEVEL GAUGE
Christo Andrea, North Branch, N.J., assignor to Diamond Power Specialty Corporation, Lancaster, Ohio, a corporation of Ohio
Continuation of application Ser. No. 237,882, Nov. 15, 1962. This application July 24, 1964, Ser. No. 387,266
4 Claims. (Cl. 73—331)

This invention relates generally to gauges and, more particularly, to liquid level gauges for high pressure steam boilers and the like and the present application is a continuation of my previously filed copending application Ser. No. 237,882 filed Nov. 15, 1962, now abandoned.

An important object of this invention is to provide an improved liquid level gauge of the type having a plurality of sight windows through which liquid level may be directly observed, and to incorporate therein improved means for sealing the transparent windows with respect to the supporting housing in which they are arranged; improved means for eliminating stresses applied to the windows; and improved means for preventing the development of unduly high stresses, while, nevertheless, permitting quick and simple removal and replacement of the windows when desired.

In gauges of this type heretofore in use, the port gasketing elements are assembled and tightened hand-tight, usually equivalent to about twenty foot-pounds torque. After the gauge has been subjected to steam, the sealing gasket loses some of its compression and the cap screws may elongate due to heat expansion and the clamping load on this gasket is relaxed. It therefore becomes necessary to retighten the cap screws of the gauge after the gauge has thus been warmed up to compensate for this loss of compression on the sealing gasket.

The specifications of water level gauges for use, for instance, in nuclear installations provide that no re-torqueing or retightening of the cap screws should be necessary for properly sealing the ports of the gauge after the unit is placed in service. This is because it is usually impossible or extremely difficult to gain access to the gauge once the boiler is in operation.

Heretofore, attempts have been made to eliminate the necessity of retightening the gasketing elements by the use of a spring washer interposed between the cover plate and the gauge glass. However, this proved to be unsatisfactory, since the total force required to seat the gasket for sealing would be transmitted through the glass. This sometimes resulted in shattering the gauge glass. This tendency to shatter the glass is heightened if cycling occurs or the bolts are tightened unevenly.

It is therefore a primary object of this invention to provide an improved gauge of the so-called loose window type in which the sealing force is completely removed from the gauge glass and wherein the sealing force is transmitted through a separate, axially movable, spring-loaded thrust transmitting member which functions both to position the glass and to yieldably compress the sealing gasket means. After a considerable period of testing at boiler pressures of from 2000 to 2700 p.s.i., it has been found that with a gauge constructed in accordance with this invention there was not one case of glass shattering; the gauge was insensitive to cycling; and the useful life of the gauge was materially lengthened over the useful life of previous gauges of this general type. Also, the necessity for retightening the gasketing elements is entirely eliminated.

These desirable advantages are obtained by a construction comprising a combined gauge glass retainer and thrust member, a cover plate adapted to be attached by cap screws to the gauge body, and a dished spring washer (commercially known as a Belleville washer) interposed between the glass retainer and cover plate which are telescoped one within the other. When the assembly, consisting of the cover plate, spring washer, and glass retainer, is secured in place by tightening the cap screws, the spring washer is compressed or flattened so that it will act as a spring to take up any relaxation of the sealing gasket (inherent in its construction or due to temperature expansion of the cap screws) and maintain a pressure on the sealing gasket substantially equal to the original pressure imposed by the torque on the cap screws. With this construction the need for retightening the cap screws is eliminated, and the pressure on the sealing gasket is applied directly thereto by the glass retainer and not through the gauge glass.

The above described principles of the invention may be embodied in a construction in which the cover plate is tightened by the cap screws until it contacts the center plate or body of the gauge, or in which the cover plate does not contact the center plate but the cap screws are tightened to a predetermined torque, either by a torque wrench or made "wrist tight" without forcing the cap screws.

Other objects of the invention are to provide a device of this type which is so reduced in the number and character of its component parts as to approach the ultimate in structural simplicity and wherein the structural simplicity of the device creates an economy in its manufacture, installation and maintenance.

The various objects and advantages, and the novel details of a commercially practical embodiment of the invention, will become more apparent as this description proceeds, especially when considered in connection with the accompanying drawings, in which:

FIGURE 1 is a front elevational view of a multi-port liquid level gauge constructed in accordance with the present invention;

FIGURE 2 is an enlarged sectional view taken substantially on the plane indicated by line 2—2 in FIGURE 1;

FIGURE 3 is a separated sectional, elevational view showing the gasketing elements more in detail; and FIGURE 4 is a fragmentary sectional view showing the cover plate assembly out of contact with the body of the gauge.

Referring first to FIGURE 1 of the drawings, it will be noted there is shown a pair of pipes 10 terminating in flanges 11, the pipes 10 being connected to and communicating with a boiler, the water level of which is to be observed. Each of the flanges 11 is associated with a mating flange 12, one of which is integral with a lower pipe 13 and the other which is integral with an upper pipe or gauge loop 14. Each of the pipes 13 and 14 is rigidly fixed to the gauge 15 and acts to support the same on the boiler.

The gauge 15 comprises a center plate or body 16 (FIGURES 2 and 3) provided with a vertically extending columnar passage defining a bore 17, FIGURE 2, extending longitudinally within the body or center plate 16. The bore 17 is connected at its lower end of the pipe 13 and at its upper end to the pipe or gauge loop 14.

The contents of the bore or passage 17 are visible through a plurality of sight ports 18 in alignment with and positioned correspondingly to transversely extending apertures 19 formed in vertically spaced portions of the body 16 in intersecting relation with the bore 17. A similar number of light port apertures 20 are provided at the opposite ends of the transverse apertures 19, as is customary in gauges of this type.

The gasketing means or elements are the same for both the sight port apertures 18 and the light port apertures 20, and it is with respect to the maintenance of the sealing efficiency of this gasketing means that the present invention particularly pertains.

On each side the body or center plate 16 is provided with a recess 25 forming a shoulder 26 which surrounds each of the transverse apertures 19. Seated on the shoulder 26 is a sealing gasket 27 which may be and preferably is of the laminated asbestos-sheet metal type with the laminations thereof bent to so-called chevron form in cross section. This type of gasket is commercially known as a "Flexitallic" gasket and is axially resiliently compressible. Seated on the gasket 27 is a protective gasket 28 usually of metal. A cushioning and protective disk 29 of relatively resilient and tough transparent material, such as mica, is fitted over the protective gasket 28 between it and the observation window 30. A packing strip 31 of asbestos or the like is usually interposed between the periphery of the lens or observation window 30 and the glass retainer 32. The reference character 33 indicates a cushion gasket made preferably of asbestos interposed between the observation window 30 and the bottom of the recess 34 in the glass retainer 32.

The glass retainer 32 forms one part of the cover plate or frame assembly, which also comprises a cover plate part 35 of cup-shaped construction into which the glass retainer 32 is telescopically fitted. Interposed between these two parts is a frusto-conical or dish-shaped washer 36. This type of washer, commercially known as a Belleville washer, functions as a stiff compression spring, the necessary stiffness thereof being of course a function of the pressure which is to be retained.

The cover plate part 35 is provided with an interiorly arranged, axially elongated annular groove 37 adapted to mate with an exteriorly arranged groove 38 adapted to receive within their confronting open ends a snap ring 39 which will hold the parts 32 and 35 in assembled relation but permit relative movement in the form of axial lost motion therebetween.

The cover plate part 35 is secured to the body 16 by fastening means such as cap screws 40 which are threaded into the body 16 as indicated at 41 in FIGURE 2. The cap screws 40 may be tightened until the cover plate 35 makes contact with the adjacent surface of the body 16, as shown in FIGURE 2, or the cover plate as shown at 35a in FIGURE 4 may be so dimensioned that it does not come in direct contact with the center plate when the cap screws 40 are tightened to a certain torque, either by a torque wrench or made "wrist tight" by hand, without forcing the cap screws, thus leaving a space 35b between cover plate part 35a and the boy 16 of the gage.

In either event, when the cover plate assembly, including the glass retainer 32, the cover plate part 35 and the spring member 36, is secured to the body 16, the spring member 36 will be loaded or tensioned by flattening the same so as to exert a continuing pressure on the glass retainer 32 to apply a continuous sealing pressure to the sealing gasket 27. It will be noted that the edge or end portion 42 of the glass retainer 32 acts through the mica disk 29 and protective gasket 28 to compress the sealing gasket 27 to press the latter into sealing engagement with the shoulder 26 and thus seal the sight and light ports 18 and 20.

As pointed out hereinbefore, after the gauge has been subjected to steam, the sealing gasket 27 loses some of its compression and the cap screws may elongate due to heat expansion and the clamping load on this gasket is thus relaxed. Ordinarily, it would be necessary to retighten the cap screws 40 to compensate for this loss of pressure on the sealing gasket. However, with this invention, the spring member or Belleville washer 36 is compressed and thus loaded when the cover plate assembly is initially secured to the gauge body or center plate 16 and will compensate for any relaxation of the sealing gasket 27 and/or screws 40 and maintain the pressure on the gasketing means substantially equal to the pressure originally imposed by the torque on the cap screws. Thus, it is unnecessary to retighten the cap screws after the gauge has been placed in service.

It will be noted that the glass or observation window element 30 is received in the recess 34 of the gasket-pressurizing thrust member or glass retainer 32 and that the pressure exerted by the glass retainer 32 on the sealing gasket 27 is not through the observation window, so that there will be no danger of shattering the observation window 30. Thus, while the observation window 30 fits snugly within the recess 34, it is relatively loose therein because the clamping pressure on the sealing gasket 27 is imposed directly on the sealing gasket and not through the observation window. The resiliency of the Belleville washer spring 36 also tends to equalize the compressive loading peripherally of the assembly, as well as to follow any movement or distortion of the parts and thus maintain a uniform seal in all areas as well as to maintain an effectively tight seal at all times as indicated.

While a commercially practical embodiment of the invention has been described and illustrated herein somewhat in detail, it will be understood that various changes may be made as may come within the purview of the accompanying claims.

What is claimed is:

1. In a liquid level gauge having a body provided with a water chamber, an observation port extending through the body from the exterior thereof and intersecting said water chamber, an observation window element for closing said port, a sealing gasket surrounding said port and having a radially projecting portion of greater diameter than the window element, such projecting portion overlying a portion of the body radially beyond the margins of said window element, a cover plate for securing said window element in closing position over said port, and means for rigidly securing the cover plate to the body, that improvement which comprises an axially rigid thrust frame surrounding the periphery of the window element and interposed between said cover plate and said projecting portion of the gasket, said thrust frame being of an axial depth such that its end toward the water chamber is substantially coplanar with the window element and being axially movable independently of the cover plate, and a spring member interposed between the cover plate and the thrust frame and compressively loaded to urge the thrust frame against the gasket and the gasket against the body independently of the window element.

2. A liquid level gauge as defined in claim 1 wherein said gasket is axially compressible through a substantial distance and said spring member is of dished form.

3. In a liquid level gauge having a body provided with a water chamber, an observation port extending through the body from the exterior thereof and intersecting said water chamber, an observation window element for closing said port, an axially compressible sealing gasket surrounding said port and having a radially projecting portion of greater diameter than the window element, such projecting portion overlying a portion of the body radially beyond the margins of said window element, a cover plate for securing said window element in closing position over said port, and means for rigidly securing the cover plate to the body, that improvement which comprises an axially rigid thrust frame surrounding the periphery of the window element and interposed between said cover plate and said projecting portion of the gasket, said thrust frame being axially movable independently of the cover plate, a spring member interposed between the cover plate and the thrust frame and compressively loaded to urge the thrust frame against the gasket and the gasket against the body independently of the window element, said cover plate being of cupped form and the thrust frame also being of cupped form and slidably fitted into the cover plate, and lost motion connecting means preventing separation of the thrust frame and cover plate but permitting relative axial movement therebetween.

4. A liquid level gauge as defined in claim 1 wherein said spring member comprises a dished washer concentric with said port and having its portion of greater radius bearing against the thrust frame and its portion of lesser radius bearing against the cover plate.

References Cited

UNITED STATES PATENTS

| | | | |
|---|---|---|---|
| 1,051,105 | 1/1913 | Hatz | 73—330 |
| 1,335,904 | 4/1920 | Macneir | 73—330 |
| 2,603,090 | 7/1952 | Brelsford | 73—331 |
| 2,882,730 | 4/1959 | Yarnall | 73—331 |
| 3,013,433 | 12/1961 | Miller et al. | 73—330 |

FOREIGN PATENTS 555,008 7/1932 Germany.

LOUIS R. PRINCE, *Primary Examiner.*

D. M. YASICH, *Assistant Examiner.*